United States Patent [19]

Donnini

[11] 4,177,864
[45] Dec. 11, 1979

[54] GARDEN CROOK

[76] Inventor: Edlo Donnini, 17 Wayne Ave., Jeannette, Pa. 15674

[21] Appl. No.: 849,328

[22] Filed: Nov. 7, 1977

Related U.S. Application Data

[63] Continuation of Ser. No. 720,760, Sep. 7, 1976, abandoned.

[51] Int. Cl.$^2$ .............................................. A01B 1/08
[52] U.S. Cl. ...................................... 172/371; 172/747
[58] Field of Search ................ 172/371, 372, 373, 375, 172/378, 379, 380, 381, 745, 747, 781; D8/7, 9, 11, 13; 76/DIG. 11

[56] References Cited

U.S. PATENT DOCUMENTS

| | | | |
|---|---|---|---|
| D. 32,854 | 6/1900 | McClintock | D8/9 |
| 73,525 | 1/1868 | Gordon | 172/380 |
| 1,039,056 | 9/1912 | Hess | 172/371 |
| 1,185,581 | 5/1916 | Beymer | 172/781 |
| 1,224,957 | 5/1917 | Robinson | 172/781 |
| 1,549,042 | 8/1925 | Masters | 172/371 |
| 1,922,917 | 8/1933 | Russell et al. | 172/747 |
| 2,343,176 | 2/1944 | Fierbaugh | 172/371 |
| 2,710,571 | 6/1955 | Pfister | 172/378 |
| 3,984,910 | 10/1976 | Helton et al. | 76/DIG. 11 X |

FOREIGN PATENT DOCUMENTS

| | | | |
|---|---|---|---|
| 102116 | 9/1937 | Australia | 172/378 |
| 118424 | 4/1944 | Australia | 172/371 |

OTHER PUBLICATIONS

"Cemented Carbides Used for Other Purposes Than Cutting Tools", *Machinery*, pp. 150–156, Aug. 1946.
Chapter 23, "Carbides," *Brazing Manual*, American Welding Society, Inc., New York, N.Y., pp. 232–236, 1963.

*Primary Examiner*—Richard T. Stouffer
*Attorney, Agent, or Firm*—Robert D. Yeager

[57] ABSTRACT

A gardening tool with a long handle, having a small flat planar portion disposed at approximately right angles to the handle and connected to the handle by a semi-circular rectangular rod portion. A straight portion is formed, extending from the partial circular portion, to attach to the long handle. The small flat portion has a taper both in depth and in width to a free cutting edge. A notch is formed in the middle of the free cutting edge. Carbide tips can be provided on the free cutting edge for increased wear resistance. The garden tool can be used for cultivating or furrowing a row to a depth of five to six inches for seed planting. When pulled through the earth, the partial circular portion easily rolls the dirt away so that there is no jam up of soil in the rod support portion. The rod member is formed from spring steel to provide for a strong, resilient tool member. The length of the flat planar portion is relatively small being of only slighter greater length than width. The width of the flat planar surface is about three times the width of the rectangular support rod. This provides for a relatively small planar surface which can be easily inserted in soil to a substantial depth. Having the flat planar surface disposed generally perpendicular to the longitudinal axis of the garden crook handle permits the cutting edge to be inserted into the soil at an appropriate depth for proper penetration.

8 Claims, 5 Drawing Figures

U.S. Patent   Dec. 11, 1979   4,177,864
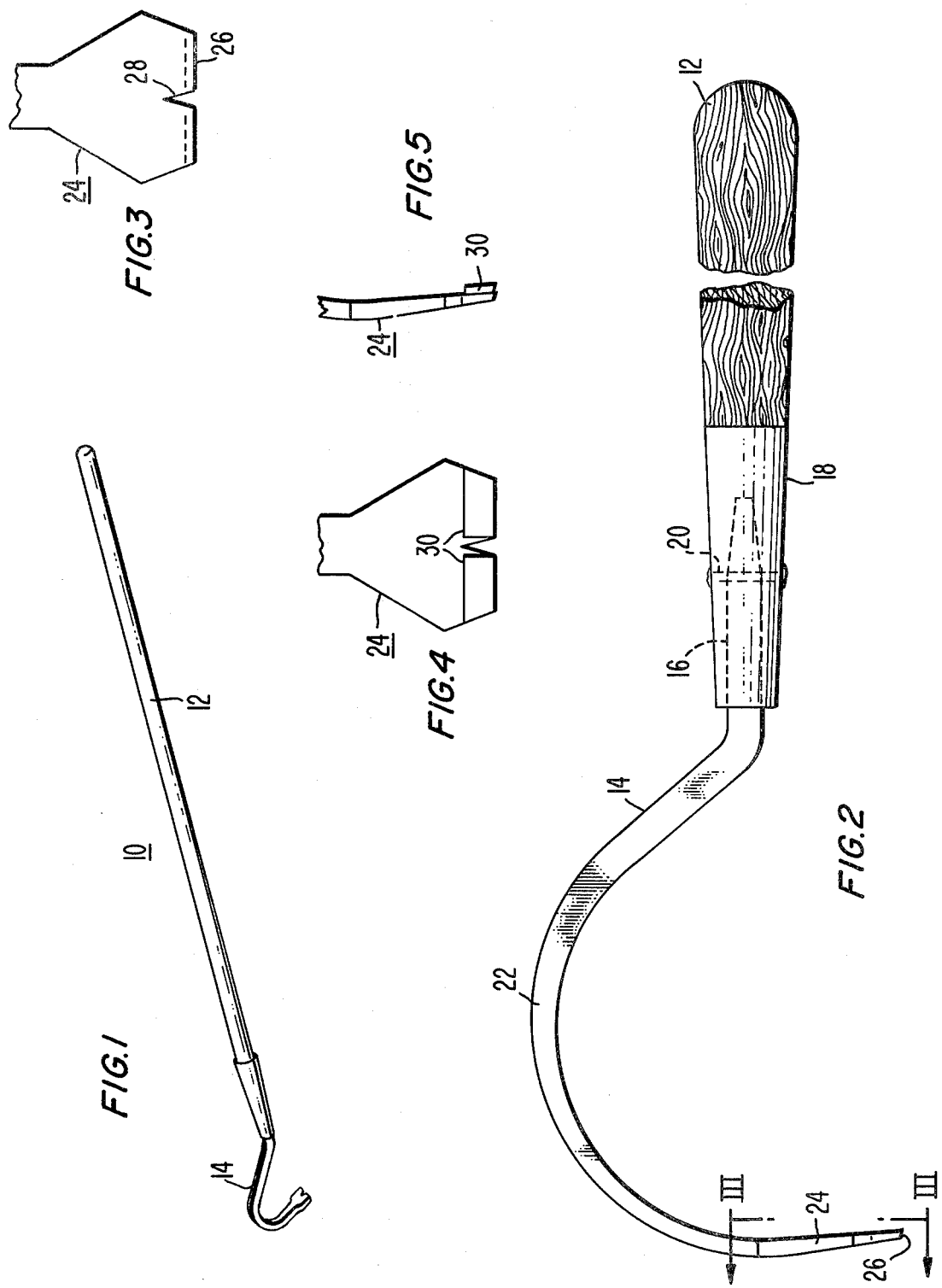

GARDEN CROOK

This is a continuation, of application Ser. No. 720,760, filed Sept. 7, 1976, now abandoned.

BACKGROUND OF THE INVENTION

1. Field of the Invention

This invention relates to a gardening device and more particularly to a long handle general purpose manual garden tool for working soil.

2. Description of the Prior Art

There are numerous prior art hand garden tools for soil cultivation. Exemplary of these tools are U.S. Pat. Nos. 1,039,056; 1,549,042; and 1,954,854. A problem with some of these prior art garden tools is that the soil working surface does not extend at a proper angle with respect to the tool handle for optimum soil penetration. Another problem is that the support for the cutting edge is configured so that there is soil entrapment as the cutting edge is pulled through the soil. Yet another problem with some prior art manual cultivating devices is that the flat working surface is relatively large or elongated so that the tool cannot be easily pulled through the earth at a depth of say five to six inches. These drawbacks limit the depth of penetration and furrowing ability of these prior art hand cultivating tools.

SUMMARY OF THE INVENTION

A garden tool having a relatively small area working surface connected to an elongated handle by a partial circular rod portion having a relatively large arc. The curvature of the rod portion supporting the flat working surface is formed to extend in a relatively large radius arc to prevent soil entrapment as the cutting edge is pulled through the soil. The working surface is supported in a plane approximately perpendicular to the longitudinal axis of the tool handle. The working surface is supported by and formed integral with a rectangular rod portion. The width of the working surface is greater than twice the width of the rod support portion but less than five times the width of the rod support portion. The length of the working surface is only slightly larger than the width. The working surface terminates in a free end portion having a cutting edge formed thereon. A notch is formed in proximity to the middle of the cutting edge for aligning and pulling weeds. Carbide tips can be provided on the cutting edge to increase wear resistance and provide for longer tool life. The working surface and rectangular rod support portion are formed as an integral member from spring steel. The rod support member at the end opposite the flat work extends into a straight portion which bends at 40° to form an attaching end. The attaching end is inserted into an opening in the tool handle and rigidly retained therein.

A garden tool is disclosed comprising an elongated handle from which an integral steel member extends from one end. The steel member comprises a straight portion which is inserted in and engages the elongated handle. A bend is formed in the straight portion at an angle of approximately 40°. The portion after the bend then extends into a semi-circular tool support portion. The semi-circular tool support portion extends into flat planar surface. A free cutting edge is formed at the end of the flat planar surface. A notch is formed in the middle of the cutting surface. The width of the flat planar portion is greater than twice the width of the rod member. The rod member is formed from spring steel. The steel member is produced from a spring steel rectangular rod member which is bent and forged to shape. The handle for supporting the steel member is relatively long and can be sixty inches or longer in length for providing a large working radius around the user.

This tool can be used for furrowing to a depth of five to six inches for seed sowing. It also provides for easy cultivating and hilling around plants and mulching. It can be turned 90° sideways and used as a tool for leveling soil around plants and breaking up lumps of soil. The steel member is forged in one piece. The lightweight long handle permits easy reaching out to work on relatively distant plants without tramping the ground inbetween. The radius of curvature of the support is formed to keep material from lodging in the curve of the tool support when furrowing. The cutting blade is made with a forked end which is sharpened to easily penetrate the soil. The length of the working surface is relatively small to permit the tool to be easily drawn through the soil at a substantial depth.

BRIEF DESCRIPTION OF THE DRAWINGS

For a better understanding of the invention, reference may be had to the preferred embodiments shown in the accompanying drawings:

FIG. 1 is an isometric view of a garden working tool formed according to the teaching of the present invention;

FIG. 2 is a side view of the tool shown in FIG. 1;

FIG. 3 is a front view of a portion of the tool working blade shown in FIG. 2 along the line III—III;

FIG. 4 is a view of the working surface for a second embodiment of the invention; and, FIG. 5 is a side view of the portion of the tool shown in FIG. 4.

DESCRIPTION OF THE PREFERRED EMBODIMENT

Referring now to the drawings, there is shown a garden working tool 10 utilizing the teaching of the present invention. Tool 10 is formed with a long wooden handle 12 which is formed of a wood such as ash, having relatively light weight and high strength. Handle 12 can be relatively long say sixty inches or longer. A steel member 14 is attached to the end of handle 12. Member 14 includes a straight portion 16 which extends into an opening formed in handle 12. The longitudinal axis of straight portion 16 and handle 12 are generally aligned. A steel collar 18 is disposed around the end of handle 12 into which straight portion 16 is positioned. Suitable means such as a rivet 20 are utilized for holding the straight portion 16 securely and rigidly within handle 12.

Steel portion 14 is formed from an integral spring steel rectangular rod which is bent and forged into the desired shape as shown in FIGS. 2 through 5. Steel member 14 is formed from a spring steel rod having a depth of ⅜ inch and a width of ½ inch. Straight portion 16 is bent at an angle of 40° from the longitudinal axis of the handle. This portion extends into a generally semicircular curved portion 22 having a relatively large radius. The radius of curved portion 22 is approximately three inches. The semi-circular portion 22 extends into a flat planar soil working portion 24. Planar portion 24 is supported in a plane which is perpendicular to the longitudinal axis of handle 12. Flat planar portion 24 has a width of one and one-fourth inches at its widest point which is approximately three times the width of the rectangular rod member 22 from which it is formed. The length of planar surface 24 is only slightly longer than its width. The width of planar surface 24 tapers to a free cutting edge 26 which has a length of approximately one inch. A notch 28 is formed in the center of cutting edge 26. Planar surface 24 has a width of approximately one quarter inch at its deepest depth and tapers to a thickness of one sixteenth inch. The free end 26 is sharpened to a cutting edge to permit easy soil penetration.

By providing that semi-circular portion 22 has a relatively large curvature, dirt cannot collect in and around the support and a relatively deep and wide furrow is easily formed by drawing the surface 24 through the soil at the desired depth. The soil is moved up and away from surface 24 as the ground is worked and does not collect on support 22. Tool 10 can also be utilized with the free edge 26 extending traverse to ground level for leveling and moving soil around plants.

Steel member 14 is formed from spring steel which has a relatively high strength and good wear resistance. However, if a tool having a longer wear life is desired, carbide tips 30 as shown in FIGS. 4 and 5 can be provided. These carbide tips 40 can be attached to planar surface 24 for increasing the wear resistance of the free edge. Carbide tips 30 are attached to planar surface 24 by suitable means such as silver soldering. The handle 12 being relatively long permits the tool to be used to work a relatively large area around the user. By providing a large curvature for the working surface support and having the working surface disposed at right angles to the longitudinal axis of the blade, a tool which can easily penetrate the ground to a depth of five or six inches is provided. This tool provides for significantly easier working of garden soil than prior art hand cultivating tools.

What is claimed is:

1. A garden tool comprising an elongated handle defining a longitudinal axis; and a unitary steel member attached to one end of said elongated handle which comprises:
    a longitudinally extending first straight portion for engaging one end of said elongated handle and defining a longitudinal axis coincident with said longitudinal axis of said handle;
    a second straight portion extending from said first straight portion at an angle of approximately 40°;
    a partial circular portion, having a rectangular cross section, extending from said second straight portion, to a position past the axis defined by the longitudinally extending first straight portion;
    a free end portion formed past the longitudinal axis defined by said first straight portion extending from said partial circular portion having a flat planar surface which terminates in a free end having a straight edge, said partial circular portion having a minimum outer curvature of a radius, from a point in line with the longitudinal axis of said elongated handle, greater than twice the width of the widest portion of said flat planar surface;
    said flat planar surface merging continuously into a side of said partial circular portion and being disposed in a plane approximately perpendicular to the longitudinal axis of said elongated handle;
    said flat planar surface having a width less than four times the width of the side of said partial circular portion into which it merges;
    said unitary steel member being forged from a spring steel member having a rectangular cross-sectional area;
    said flat planar surface tapering in width to said free end from said widest part and also tapering in width from said widest part to said partial circular portion; and
    the width of said widest part of said flat planar surface being less than two inches.

2. A garden tool as claimed in claim 1 wherein:
said handle is formed from wood and is at least sixty inches long.

3. A garden tool as claimed in claim 2 wherein:
the length of said straight edge of said free end is less than the height of said flat planar surface.

4. A garden tool as claimed in claim 3 wherein:
the thickness of the working face is tapered.

5. A garden tool as claimed in claim 4, comprising:
carbide tips silver soldered to the free end of the working face.

6. A garden tool as claimed in claim 5 comprising:
a steel collar disposed around the end of said elongated handle engaged by said first straight portion; and,
a rivet extending through said first straight portion and said steel collar.

7. A garden tool as claimed in claim 6 wherein:
the working face is disposed in a plane which is perpendicular to the longitudinal axis defined by said handle.

8. A hand garden tool as claimed in claim 7 wherein:
said elongated wooden handle is formed from ash.

* * * * *